United States Patent
Yin et al.

(10) Patent No.: US 11,707,065 B2
(45) Date of Patent: Jul. 25, 2023

(54) METHOD FOR BIOFILM DISPERSAL

(71) Applicants: MC (US) 3 LLC, Wilmington, DE (US); THE PENN STATE RESEARCH FOUNDATION, University Park, PA (US)

(72) Inventors: Bei Yin, Phoenixville, PA (US); Thomas Wood, Port Matilda, PA (US); Venkata Giridhar Poosarla, Andhra Pradesh (IN)

( * ) Notice: Subject to any disclaimer, the term of this patent is extended or adjusted under 35 U.S.C. 154(b) by 320 days.

(21) Appl. No.: 16/632,408

(22) PCT Filed: Jun. 15, 2018

(86) PCT No.: PCT/US2018/037690
§ 371 (c)(1),
(2) Date: Jan. 20, 2020

(87) PCT Pub. No.: WO2019/018087
PCT Pub. Date: Jan. 24, 2019

(65) Prior Publication Data
US 2020/0138024 A1    May 7, 2020

Related U.S. Application Data

(60) Provisional application No. 62/533,907, filed on Jul. 18, 2017.

(51) Int. Cl.
*A01N 43/16* (2006.01)
*C02F 1/50* (2023.01)

(52) U.S. Cl.
CPC ............... *A01N 43/16* (2013.01); *C02F 1/50* (2013.01)

(58) Field of Classification Search
None
See application file for complete search history.

(56) References Cited

U.S. PATENT DOCUMENTS

| | | | |
|---|---|---|---|
| 7,060,486 B2 | 6/2006 | Wood et al. | |
| 2012/0087993 A1 | 4/2012 | Martin | |
| 2013/0136782 A1* | 5/2013 | Blackwell | A61K 31/4184 548/307.4 |
| 2014/0349975 A1 | 11/2014 | Yin et al. | |
| 2016/0000680 A1 | 1/2016 | Schaeffer-Korbylo et al. | |
| 2016/0082023 A1* | 3/2016 | Choi | A61K 31/7004 514/23 |
| 2016/0280570 A1 | 9/2016 | Frail et al. | |
| 2017/0191357 A1* | 7/2017 | Nguyen | E21B 43/247 |

FOREIGN PATENT DOCUMENTS

WO    9636569 A1    11/1996

OTHER PUBLICATIONS

Sutrina, S. L., Griffith, M. S., & Lafeuillee, C. (2016). 2-Deoxy-d-glucose is a potent inhibitor of biofilm growth in *Escherichia coli*. Microbiology, 162(6), 1037-1046. (Year: 2016).*

Purish, et al., "Role of Polymer Complexes in the Formation of Biofilms by Corrosive Bacteria on Steel Surfaces", App. Bio. and Micro., vol. 48, No. 3, pp. 262-269 (2012).

Poosaria, et al., "Dispersal and inhibitory foles of mannose, 2-deoxy-d-glucose and N-acetylgalactosaminidase on the biofilm of Desulfovibrio vulgaris", Env. Micro. Rpts., vol. 9, No. 6 pp. 779-787 (2017).

* cited by examiner

*Primary Examiner* — Dale R Miller

(57) ABSTRACT

The present invention relates to a method for dispersing biofilm using mannose and its analogs.

5 Claims, No Drawings

METHOD FOR BIOFILM DISPERSAL

The present invention relates to a method for dispersing biofilm using mannose and its analogs.

Sulfate-reducing prokaryotes (SRPs) are notorious for their detrimental effects on the vast infrastructure required to produce and transport oil and gas. These organisms, known for growing in both planktonic and sessile communities, are some of the major contributors to reservoir souring, microbially influenced corrosion (MIC) of equipment and other mild steel components, and biofilm-induced clogging and restriction of flow. The negative impact of SRPs on both oil production costs and product quality has made these organisms attractive targets for advanced microbial control strategies.

Within the SRPs, bacteria in the genus *Desulfovibrio* have been demonstrated to be prevalent in oil and gas applications. In particular, *Desulfovibrio vulgaris* (*D. vulgaris*) forms robust biofilms that are able to induce pitting corrosion in mild steel. U.S. Pat. No. 7,060,486 discloses that forming biofilm of non-native aerobic bacteria which secrete antimicrobial agents in a system containing SRB may inhibit the growth of SRB in aqueous systems. Although biocidal efficacy and inhibition has been positively demonstrated against SRB, a demand exists for biocide alternatives that are less toxic, more sustainable and demonstrate the ability to disperse existing biofilm.

US2016/0000680A1 demonstrates that 2-Deoxy-D-glucose is able to inhibit biofilm formation in aerobic and facultative bacteria such as *Escherichia coli* and oral bacteria; however there is no teaching of biofilm formation inhibition in obligate anaerobic SRB. Additionally, no biofilm dispersal of formed biofilm was discussed. Because biofilm inhibition and dispersal involve two different processes and mechanisms, a need remains for an effective method to disperse existing biofilm.

The present invention seeks to solve the problems of the art by providing a method to disperse existing biofilm comprising providing a biofilm; and contacting the biofilm with a compound selected from the group consisting of mannose, 2-deoxy-D-glucose (2DG), methyl α-D-mannopyranoside (αMM), methyl α-D-glucopyranoside (αMG), and mixtures thereof to disperse the biofilm.

As used herein, "biofilm" is defined as a multicellular bacterial community composed of surface-associated microbial cells that are held together by a self-developed matrix of extracellular polymeric substance.

As used herein "biofilm dispersal" is defined as the detachment of all or partial sessile cells from the biofilm. Biofilm dispersal is the final stage of the biofilm life cycle and could involve numerous signaling and regulating processes.

Biofilms of the present invention are found in aqueous systems such as, for example, industrial wastewater systems and waters resulting from oil and gas operations.

Biofilms of the present invention comprise prokaryotes. Suitable prokaryotes are bacteria, preferably anaerobic bacteria. The biofilms of the present invention may comprise sulfate-reducing prokaryotes (SRPs), suitably sulfate reducing bacteria. Such sulfate reducing bacteria may be of the *Desulfovibrio* genus and in particular, *Desulfovibrio vulgaris* (ATCC 29579), *Desulfovibrio desulfuricans* (DSM 12129) or mixtures thereof.

To disperse the biofilms, the biofilms are contacted with a compound selected from the group consisting of mannose, 2-deoxy-D-glucose (2DG), methyl α-D-mannopyranoside (αMM), methyl α-D-glucopyranoside (αMG), and mixtures thereof. Useful concentrations of mannose and its derivatives range from 1 to 500 mM, alternatively 5 to 500 mM, alternatively 30 to 500 mM, and alternatively 100 to 500 mM.

The following examples are provided for illustrative purposes only, and are in no way intended to limit the scope of the present invention beyond the scope aforementioned in the specification.

EXAMPLES

Cultures of *Desulfovibrio vulgaris* (ATCC 29579) and *Desulfovibrio desulfuricans* (DSM 12129) were prepared in Modified Baar's medium at 30 C under anaerobic conditions. The bacterial cultures were then used to prepare bacterial suspensions in fresh Modified Baar's medium to a cell density of 0.1 (Table 2 to 6) or 0.05 (Table 1) at 600 nm. The appropriate bacterial suspension was used to fill 96-well plates and the plates were incubated in an anaerobic glove box for 24 h (Table 2 to 6) or 48 h (Table 1) at 30° C. to develop biofilms. Stocks of D-mannose (2.85 M, Alfa Aesar, Cat #A10842), 2DG (1.22 M, Alfa Aesar, Cat #AAAL07338-06), αMM (1.22 M, Acros Organics, Cat #AC229251000), and αMG (1.22 M, Alfa Aesar, Cat #AAA12484-22) were prepared in sterile distilled water and filtered through a 0.22 μm filter. For biofilm dispersal assay, the planktonic cells were removed, and the plates were washed with 150 μL of 1× of phosphate buffered saline (pH 7.4); D-mannose, 2DG, αMM, and αMG were added, the volume was adjusted with 1×PBS, pH 7.4 to 150 μL, and the plates were incubated in the anaerobic glove box for 2 h (Table 1, 2, 4, 5, 6) or 14 h (Table 3) for biofilm dispersal studies. After the treatment, supernatants were discarded; the wells were washed three times with deionized water (DW) by dipping the plates into a 1 L solution of DW, and the plates were dried via a piece of paper towel by patting. 300 μL of 0.1% crystal violet was added to each well, the plates were incubated for 20 minutes at room temperature (25° C.), and the staining solution was discarded. The plates were washed three times with DW by dipping the plates into a 1 L solution of DW, then 300 μL of 95% ethanol was added to each well, and the plates were soaked for 5 min to dissolve the crystal violet. Total biofilm was measured spectrophotometrically at 540 nm using a Sunrise microplate reader (Tecan, Austria Gesellschaft, Salzburg, Austria). Total biofilm remaining after the treatments were summarized in Table 1 to 6.

TABLE 1

Remaining biofilm of *D. vulgaris* after 2 h mannose treatment

| Concentration | OD540 | Standard deviation |
|---|---|---|
| 500 mM | 0.46 | 0.04 |
| 100 mM | 0.48 | 0.06 |
| 30 mM | 0.52 | 0.01 |
| Negative control | 0.92 | 0.02 |

TABLE 2

Remaining biofilm of *D. vulgaris* after 2 h 2DG treatment

| Concentration | OD540 | Standard deviation |
|---|---|---|
| 500 mM | 0.18 | 0.07 |
| 100 mM | 0.17 | 0.04 |

TABLE 2-continued

Remaining biofilm of *D. vulgaris* after 2 h 2DG treatment

| Concentration | OD540 | Standard deviation |
|---|---|---|
| 30 mM | 0.24 | 0.06 |
| Negative control | 0.35 | 0.10 |

TABLE 3

Remaining biofilm of *D. vulgaris* after 14 h 2DG treatment

| Concentration | OD540 | Standard deviation |
|---|---|---|
| 10 mM | 0.16 | 0.06 |
| 5 mM | 0.21 | 0.01 |
| 1 mM | 0.24 | 0.05 |
| Negative control | 0.26 | 0.03 |

TABLE 4

Remaining biofilm of *D. vulgaris* after 2 h αMM treatment

| Concentration | OD540 | Standard deviation |
|---|---|---|
| 500 mM | 0.23 | 0.01 |
| 100 mM | 0.40 | 0.11 |
| 30 mM | 0.42 | 0.09 |
| Negative control | 0.46 | 0.11 |

TABLE 5

Remaining biofilm of *D. vulgaris* after 2 h αMG treatment

| Concentration | OD540 | Standard deviation |
|---|---|---|
| 500 mM | 0.45 | 0.05 |
| 100 mM | 0.33 | 0.05 |
| 30 mM | 0.39 | 0.03 |
| Negative control | 0.52 | 0.12 |

TABLE 6

Remaining biofilm of *D. desulfuricans* after 2 h treatment with mannose and its analogs

| Concentration of treatment | | OD540 (average) | Standard deviation |
|---|---|---|---|
| Mannose | 500 mM | 0.39 | 0.02 |
| | 100 mM | 0.43 | 0.02 |
| | 30 mM | 0.49 | 0.01 |
| 2DG | 500 mM | 0.41 | 0.02 |
| | 100 mM | 0.49 | 0.05 |
| | 30 mM | 0.59 | 0.13 |
| αMM | 500 mM | 0.50 | 0.02 |
| | 100 mM | 0.53 | 0.03 |
| | 30 mM | 0.60 | 0.12 |
| αMG | 500 mM | 0.55 | 0.06 |
| | 100 mM | 0.62 | 0.06 |
| | 30 mM | 0.75 | 0.15 |
| Negative control | | 0.88 | 0.17 |

What is claimed is:

1. A method to disperse existing biofilm comprising:
   i. providing a biofilm wherein the biofilm comprises sulfate-reducing prokaryotes; and
   ii. contacting the biofilm with a compound selected from the group consisting of mannose, 2-deoxy-D-glucose (2DG), methyl α-D-mannopyranoside (αMM), methyl α-D-glucopyranoside (αMG), and mixtures thereof to disperse the biofilm.

2. The method of claim 1 wherein biofilm comprises anaerobic bacteria.

3. The method of claim 1 wherein biofilm comprises sulfate reducing bacteria.

4. The method of claim 2 wherein the biofilm comprises *Desulfovibrio vulgaris* (ATCC 29579).

5. The method of claim 2 wherein the biofilm comprises *Desulfovibrio desulfuricans* (DSM 12129).

\* \* \* \* \*